United States Patent [19]

Maklad

[11] 4,372,767
[45] Feb. 8, 1983

[54] METHOD OF MANUFACTURING OPTICAL FIBERS

[75] Inventor: Mokhtar S. Maklad, Milford, Conn.

[73] Assignee: EOTec Corporation, West Haven, Conn.

[21] Appl. No.: 312,539

[22] Filed: Oct. 19, 1981

[51] Int. Cl.³ .................... C03B 37/025; C03B 37/075
[52] U.S. Cl. ...................................... 65/3.12; 65/3.11; 65/3.14; 65/136
[58] Field of Search ...................... 65/3.11, 3.12, 3.14, 65/13, 136; 427/163

[56] References Cited

U.S. PATENT DOCUMENTS

| | | | |
|---|---|---|---|
| 3,294,504 | 12/1966 | Hicks, Jr. | 65/3.11 X |
| 3,822,120 | 7/1974 | Koizumi et al. | 65/3.14 |
| 3,950,073 | 4/1976 | Horiguchi et al. | 65/3.11 X |
| 4,277,270 | 7/1981 | Krohn | 65/3.11 |

FOREIGN PATENT DOCUMENTS

| | | | |
|---|---|---|---|
| 2440121 | 3/1975 | Fed. Rep. of Germany | 65/3.11 |
| 1340849 | 12/1973 | United Kingdom | 65/3.12 |

*Primary Examiner*—Richard V. Fisher
*Attorney, Agent, or Firm*—Darby & Darby

[57] ABSTRACT

A process for making an optical fiber includes the steps of inserting a rod of the core glass composition into a closed tube made of the cladding glass. The diameter of the rod is substantially less than the inner diameter of the tube. The glass transition temperature of the core glass must be substantially lower than the glass transition temperature of the cladding and the rod is placed in contact with the tube along its entire length. When heat is applied to the lower portion of the rod and tube, the rod melts and forms a thin film on the inner surface of the tube which can rapidly be fined to a relatively pure glass. This melted glass forms a melt pool in the bottom of the tube, and the tube and pool can then be drawn into a fiber with the desired characteristics. A process for making a graded optical fiber utilizing a modified chemical vapor deposition process is also disclosed wherein a cladding glass is entrained on the inner surface of a tube substrate. A core rod is then inserted into the coated substrate tube. At the high drawing temperatures, ion exchange occurs between the core glass and the cladding glass to produce low loss graded optical fibers having an improved refractive index profile. Low loss, single mode optical fibers and single polarization guidance fibers can also be made by this method.

8 Claims, 3 Drawing Figures

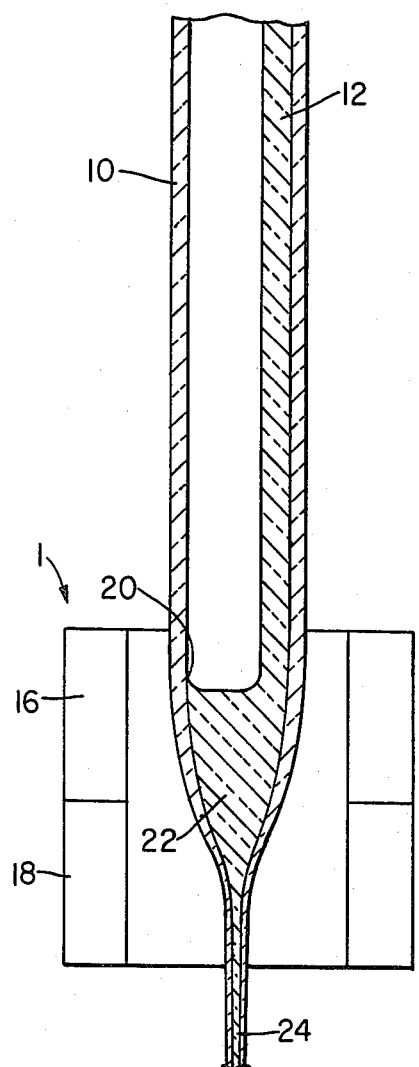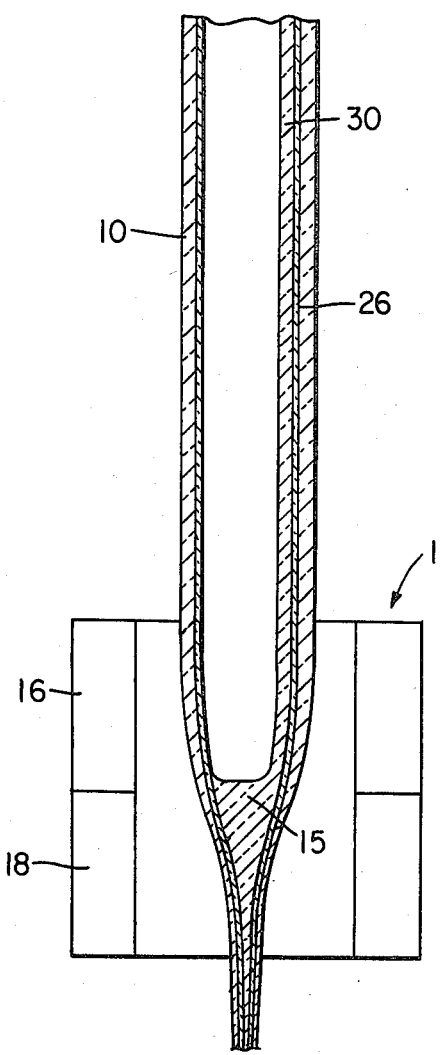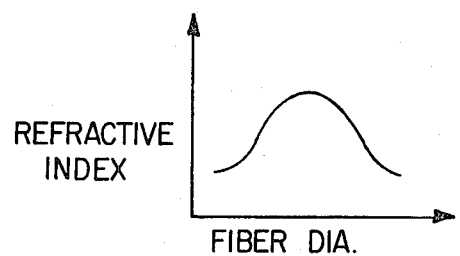

METHOD OF MANUFACTURING OPTICAL FIBERS

This invention relates to optical fibers and, more particularly, to a method of manufacturing low loss optical fibers and graded optical fibers.

Known optical fibers comprise a glass core enveloped by a glass cladding layer having an index of refraction (n2) less than the index of refraction of the core material (n1). Simply stated, the difference between these indices causes light rays entering the fiber within a specified angle to be reflected internally and thereby transmitted through the fiber.

Many different techniques have been proposed to manufacture optical fibers, or optical waveguides as they sometimes are called, with minimal transmission losses. Transmission losses in an optical fiber are due to intrinsic glass scattering and absorption, impurity absorption, cladding loss, core/cladding imperfections and geometry loss. Impurity absorption losses occur because transition metal ions and OH groups in the glass absorb light [e.g., 1 part per million iron will result in a loss of 100 db per km at 800 nm (nanometers)]. Scattering loss is due to imperfections in the fiber core, such as bubbles, microcracks and debris, as well as from composition and density fluctuations. Cladding loss exists because of imperfections at the core-cladding interface. Geometry loss is due to bends in the fiber and is an inverse function of the numerical aperture. A low loss fiber should have losses no greater than 150 db per km.

One of the best-known techniques for manufacturing optical fibers involves the insertion of a rod of core material into a tube of cladding material, and then melting the core and drawing the melted core and tube at elevated temperature to the desired cross section. It is considered important that the glass transition temperatures (Tg) of the rod and tube be approximately equal in order to avoid stresses between the glasses. This requirement severely limits the selection of glass compositions; moreover, fibers heretofore manufactured by this process are of relatively low efficiency because of excessive losses and dispersion. This is due essentially to incomplete fining and outgassing which results in the formation and retention of minute bubbles in the core glass and at the core-cladding interface.

U.S. Pat. No. 4,163,654 to Krohn et al mentions and generally describes other processes for manufacturing optical fibers, including the double crucible process, the chemical vapor deposition process, and the ion leaching process.

In addition to the foregoing, British Pat. No. 1,340,849 to Uffen discloses a process for manufacturing optical fibers wherein a tube of cladding material serves as a crucible in which the core glass is melted. The batch for the core glass is premixed and introduced into the tube in a powder form, with particle sizes chosen "so that when a fine grain of the powder mixture falls on the surface of the hot melt volatile products may be uninterruptibly evolved . . . ". This reduces the fining period.

The Uffen process theoretically produces a very low loss fiber which may include thermally mismatched multi-component core glass compositions because contaminants and imperfections at the core/cladding interface are avoided. However, in the Uffen process, the falling powder tends to quench the melt pool which makes it difficult, if not impossible, to continuously draw the fiber. Moreover, since volatile components tend to evaporate from a powder, compositions containing such volatile components cannot be used in the Uffen process. Furthermore, in some cases, the high temperatures required to melt the falling powder and confine the melt pool at its surface, may cause the silica tube to liquify above rather than below the melt surface. This ultimately prevents fiber from being drawn.

Graded optical fibers have a refractive index profile across the fiber core. One known method for manufacturing graded optical fibers, the double crucible drawing technique, utilizes an ion exchange diffusion reaction between the core and the cladding glasses. The index of refraction profile is controlled by the contact length between the core and the cladding glass at the double crucible nozzle, the relative mobility of the inter-diffusing ions and the drawing speed. These parameters limit the manufacture of graded optical fibers when high bandwidth and high speed drawing are required. Another known method for manufacturing graded optical fibers is the modified chemical vapor deposition or outside vapor deposition method. In this method several glass layers are deposited in the optical preform. Each layer has a different retractive index in order to produce a nearly parabolic profile when the preform is collapsed and drawn.

OBJECTS OF THE INVENTION

The principal object of the invention is to provide a process for manufacturing low loss optical fibers.

A more specific object of the invention is to provide a relatively simple process for manufacturing a low loss optical fiber which overcomes or at least minimizes the abovementioned drawbacks of the Uffen process.

A second object of the invention is to provide a method for producing a low loss graded optical fiber with an improved index profile accurately tailored for high bandwidth transmission.

A further object of this invention is to provide a method for producing a low loss, single mode, compound core optical fiber for data transmission.

SUMMARY OF THE INVENTION

In accordance with the invention, a rod of the desired core glass composition is inserted into a closed tube made of the cladding material. The rod is substantially smaller in diameter than the tube and is placed in contact with the inner surface of the tube so that contact occurs along a line. The glass transition temperature of the core glass must be substantially lower than the glass transition temperature of the cladding composition so that when heat is applied to the rod and tube, the bottom of the rod melts and coats the lower portion of the tube as a film prior to forming a melt pool in the base of the tube. The thin film of the core composition in this stage is rapidly fined to rid the glass of small bubbles which would tend to introduce transmission losses. The film tends to fill the melt pool in a way which minimizes the need for outgassing. The fiber is then drawn from the tube and melt pool in the conventional fashion.

The basic invention is well suited to the production of a low loss graded index optical fiber with an improved index profile and reduced optical loss. In this respect, the tube substrate may be coated with a cladding layer of a low refractive index composition. A core glass rod is then fed into the coated tube and the fiber is then drawn at about 2000 degrees C. The index gradient is achieved by ion exchange of sodium and potassium ions in the core and cladding glass at the high drawing temperature. The process can be used to manufacture low loss, small diameter, compound glass core fibers and single mode, graded optical fibers which are desirable for maintaining high bandwidth data transmission. The single mode fibers can also be adapted for single polarization guidance for even higher bandwidths in telecommunications and sensor application techniques.

BRIEF DESCRIPTION OF THE DRAWING

FIG. 1 shows diagrammatically the apparatus and materials used to produce the optical fiber of the present invention.

FIG. 2 shows diagramatically the apparatus and materials used to produce a graded optical fiber in accordance with the invention.

FIG. 3 shows the refractive index profile for the graded optical fiber of FIG. 2.

DETAILED DESCRIPTION

Referring to FIG. 1, a tube 10 made of the desired cladding material is closed at its lower end. A commercially available, high purity, fused silica tube may be used as tube 10 or the tube 10 may be formed of a high silica sodium borosilicate material (e.g., Vycor).

Tube 10 is open at its upper end to receive a rod 12 made of the core glass material. The rod 12 is preferably substantially smaller in diameter than the tube 10. The rod 12 contacts the inner surface of the tube 10 so that the tube and the rod are in line contact along the entire length of the tube.

Two heating elements 16 and 18 envelop the tube 10 at its lower end. Heaters 16 and 18 may, for example, contain graphite resistance heating devices. Heater 16 provides a high temperature melting zone, the purpose of which is described below. The lowermost heater 18 raises the temperature of the glass to the drawing temperatures so that the fiber can be drawn.

Although many different glass compositions can be used as the core and the cladding, successful operation of the invention requires a substantial differential between the glass transition temperatures of the core glass composition and cladding glass composition selected. Preliminary experiments indicate that this temperature differential should be 200 degrees C. or more with excellent results being achieved with a differential of 450 degrees C.

In accordance with the invention, the heating element 16 raises the temperature of the tube 10 and rod 12 to a temperature at which the rod 12 melts and forms a thin film, shown diagramatically at 20, on the inner surface of the tube 10. Assuming a proper differential between the glass transition temperatures of the core and cladding glass compositions, the forces due to viscosity will overcome surface tension forces and enable the thin film 20 to wet substantially the entire curcumference of the inner surface of the tube 10. As additional core material is melted, a melt pool 22 is formed at the bottom of the closed tube 10. When the temperature of the melt pool is raised by heater 18 to a suitable drawing temperature, the fiber 24 is then drawn in a conventional fashion.

Because the invention requires glasses having a large thermal expansion coefficient mismatch, multi-component core glass compositions having known advantages in fiber optics may be used. The thin film of the melted core glass on the inner surface of tube 10 is rapidly fined and because the film tends to form the melt pool 22 from the bottom and the sides of tube 10, outgassing is not needed to rid the core-cladding interface of bubbles.

As mentioned above, many different glass compositions can be used as the core glass. In the preferred embodiments, the core glass is a borosilicate glass to which modifiers are added to increase the index of refraction and the numerical aperture. Suitable modifiers for this purpose include lead oxide (PbO), barium oxide (BaO) and germanium dioxide ($GeO_2$). These modifiers may cause glass stability problems, and agents such as calcium, zinc or alumina may be added as stabilizing agents. To facilitate melting the glass for drawing, fluxing agents such as the oxides of the alkali metals (for example, potassium, sodium and lithium) may also be added. Arsenic may be used as a fining agent.

The following table gives four examples of suitable glass compositions for use as the core glass with the numbers indicating weight percentages.

| | $SiO_2$ | BaO | $Al_2O_3$ | $B_2O_3$ | $Li_2O$ | $Na_2O$ | $K_2O$ | $GeO_2$ | $As_2O_3$ |
|---|---|---|---|---|---|---|---|---|---|
| Glass A | 66 | | 6 | 24 | 1 | 2 | | | 1 |
| Glass B | 27 | 18 | | 29 | | 25 | | | 1 |
| Glass C | 65 | | | 20.9 | | 3.8 | 0.6 | 9.7 | |
| Glass D | 50 | 5 | | 21 | | 3.5 | 0.5 | 19 | 1 |

To make the rod 12, the core glass components (for example, as indicated in the above table) may be melted and fined in a conventional platinum or silica crucible. A mixture of $CO_2$ and CO may be bubbled through the melt to control the redox conditions in the glass to change the valence state of the transition metal ions and shift them so that their absorption is not in the main transmission window (800-1500 nanometers) for telecommunications. A glass cane or rod may then be drawn from the melted glass at a suitable temperature.

As a specific example, a core glass composition as shown in Example C in the above table was formed with a diameter of 7 mm. This rod was inserted into a high silica borosilicate glass tube having an inner diameter of 12.5 mm and an outer diameter of 15 mm, the core glass contacting the inner surface of the tube along its full length. The glass transition temperature (Tg) for the tube was 910 degrees C. and the glass transition temperature (Tg) for the core was 400 degrees C., providing a differential of 510 degrees C.

The silica tubing had been thoroughly chemically cleaned using an ultra high purity solvent and then fire polished before the rod was inserted.

The temperature in the melt zone 22 was raised to 1400 degrees C. by the heater 16. At this temperature, the glass rod melted and wetted the inner surface of tube 10 in the form of thin film 20 which was easily fined into a high purity clear glass.

It is important that the core glass rod 12 touches the silica tube 10 along the entire length of the tube. This prevents dripping of molten glass into the melt pool 22 and reduces temperature fluctuations at the drawing zone. In the example, the melt pool 22 reached a depth of 9 mm.

The fiber was drawn at a temperature of 2000 degrees C. at a rate of 19 meters per minute. The resulting fiber had an outer diameter of 270 um, and a core diameter of 160 um. The numerical aperture (NA) was 0.22 and the surface compression was equal to 20 kpsi.

The invention may be incorporated into a batch or continuous process. In a continuous process, as in the example given above, the feed rate of the rod 12 into tube 10 was 12 mm per minute. This feed rate is very important and must be low enough to: (a) permit complete fining of the core glass; and (b) prevent entrapment of bubbles at the core-cladding interface (or elsewhere).

The dimensions and characteristics of the fiber may be controlled in conventional ways. For example, the fiber diameter and the ratio of the core diameter to the cladding thickness may be controlled by adjusting the drawing temperature and the dimensions of the rod 12 and tube 10. Generally, a lower drawing temperature tends to increase the ratio of the core diameter to the cladding thickness.

If it is desired to produce a graded index fiber, the melt pool 22 may be maintained at a high temperature to promote mixing of the core and cladding glasses. This will cause a gradual change in the index of refraction across the core-cladding interface.

A modified chemical vapor deposition (MCVD) method may be employed in conjunction with the above described drawing process to produce low loss, high numerical aperture, graded optical fibers having an improved refractive index profile which can be accurately tailored for high bandwidth transmission.

In this process, as illustrated in FIG. 2, the inner surface of the substrate tube 10 is coated with a layer of low refractive index cladding glass 26. The cladding glass is selected so that its refractive index is lower than the refractive index of the core 30. Grading the optical fiber by making the index of refraction of cladding glass 26 lower than the index of refraction of core 30 is useful for reducing dispersion with multiple mode rays. Multiple mode light rays refer to those rays which strike the fiber at a variety of grazing angles. Single mode rays strike the fiber at grazing angles of 90 degrees and pass directly through the center of the fiber core without dispersion. Rays striking the fiber at grazing angles other than 90 degrees must travel longer paths through the fiber. Since they travel longer paths they would ordinarily not exit the fiber at the same time as rays having grazing angles of 90 degrees. This differential in exit time reduces the data transmission capability of the fiber. To compensate for this the fiber is graded with the outer periphery having a lower index of refraction than the core center, as shown in FIG. 3. This allows light rays entering the fiber at grazing angles other than 90 degrees to travel at higher velocity through the outer periphery of the fiber thereby reducing dispersion and improving the data transmission capability. As the diameter of the core is reduced many of the multiplicity of rays having different grazing angles are prevented from passing through the fiber. The core diameter may be so reduced such that in a given operating wavelength range only rays which pass directly through the center of the core are allowed through the fiber. A single mode fiber is one in which only those rays having grazing angles of 90 degrees are allowed to pass through the core of the fiber. As a result in single mode fibers little dispersion of the light occurs and the character of the light is not distorted as it passes through the core. The single mode fiber has a high bandwidth and an excellent data transmission capability. Low loss, compound glass core, single mode fibers having cores of a few microns in diameter have not been made before.

Single mode light rays still contain two polarizations. One polarization of light may travel at a different velocity through the core than the other. As a result, the bandwidth is reduced when both polarizations are allowed to pass through the fiber. In order to obtain optimal bandwidth and maximum data transmission for telecommunications and sensitive measuring techniques, using optical fibers, single polarization is preferred. Single polarization may be accomplished by discouraging one of the two polarizations. This is achieved by selecting the core and cladding materials with different thermal expansion characteristics. The thermal expansion difference creates a stress mismatch in the fiber which discourages one of the polarizations and creates a single mode, single polarization guidance fiber.

The modified chemical vapor deposition method for depositing cladding glass 26 on substrate tube 10 is a major improvement over conventional chemical vapor deposition methods. The rate of deposition of the cladding glass on the tube substrate is increased over conventional methods. This increase in the rate of deposition is caused by high temperature homogeneous and heterogeneous reactions, as compared with only heterogeneous surface reactions in conventional chemical vapor deposition methods. In the MCVD method the substrate tube is held, as by chucks, in a rotating glass lathe. The tube substrate is heated to a high temperature by a fire carriage. The fire carriage moves longitudinally along the length of the substrate tube 10. As the fire carriage moves along the tube the cladding glass solution is atomized, as by a nebulizer, into a mist and sprayed onto the tube substrate. The mist undergoes a heterogenous reaction on the surface of the tube substrate. In addition, due to the high temperature of the substrate a homogeneous reaction also occurs. This homogeneous reaction causes the cladding material to fuse onto the substrate forming a smooth glassy layer 26.

In a preferred embodiment an alkali silicate cladding composition doped with $B_2O_3$, $GeO_2$ or $P_2O_5$ is deposited on the inside of the silica substrate tube 10. The alkali ions and their concentrations in the core glass and the cladding glass are selected such that ion exchange takes place between them at high temperature. Ion exchange or interdiffusion of the ions in the core and cladding glass is used to provide a controlled retractive index profile in the graded fiber. One illustrative example of the composition of the core and cladding glass compositions suitable for refractive index profiling according to this method is shown, in weight percents, in the following table.

|  | $SiO_2$ | $GeO_2$ | $Al_2O_3$ | CaO | $Na_2O$ | $K_2O$ | $As_2O_3$ |
|---|---|---|---|---|---|---|---|
| Core % | 43.95 | 29.0 | 2.0 | 10.0 | 14.0 | 1.0 | 0.05 |
| Cladding % | 49.45 | 27.5 | 8.05 | — | — | 15.0 | — |

With the compositions shown above, ion exchange will occur at the high drawing temperatures of around 2000 degrees C. Ion exchange occurs between the sodium ions in the core glass and the potassium ions in the cladding glass as a result of the differences in their relative concentrations. It is also possible to select a suitable core glass composition in which the concentration of potassium ions is greater than the concentration of sodium ions and a suitable cladding glass composition in which the concentration of sodium ions is higher than the concentration of potassium ions. By this selection ion exchange will occur as a result of the concentration gradient established between the potassium ions in the core and cladding and between the sodium ions in the cladding and the core. Other system combinations can also be used to form the graded optical fiber. For example, thallium ions in the core glass can exchange by diffusion with sodium ions in the cladding glass. Ion exchange will not occur between the substrate tube 10 and the cladding glass 26 due to the composition of the substrate tube 10. Tube 10 is formed from materials which are more rigid or more highly viscous at the high drawing temperatures than the cladding glass. This rigidity inhibits the movement of the ions in the substrate tube and inhibits ion exchange between the cladding glass and the tube substrate. The lower viscosity of the cladding glass and core at the high drawing temperatures favors ion exchange between layers. In addition to the rigidity of the tube substrate, the amount of sodium or potassium ions in the tube substrate is always selected to be lower than the amount of the sodium of potassium ions in the core glass. As a result, less potential for ion exchange exists between the cladding and the tube substrate as compared with the core.

In the preferred MCVD method for depositing the cladding glass material 26 on the inside of the substrate tube 10, the calcium, sodium and potassium ions in the cladding glass are first atomized in the form of a salt solution mist. The mist is entrained into the substrate tube 10 as by a nebulizer. The heat and the presence of oxygen oxidizes the salt solutions into their respective oxides which then fuse to form a coating of glass on the substrate tube 10. Germanium and silicon in the form of gaseous halides, having high vapor pressures, are fed through the substrate tube 10. Upon heating, the halides also react with oxygen and are converted to their respective oxide forms which fuse forming a glass coat on the substrate tube 10.

Next a glass rod 30 of the core material having a diameter less than the diameter of the substrate tube 10 is inserted along the cladding glass 26 coating of the substrate tube 10. The insertion of the core into the tube is accomplished in accordance with the method previously described for producing low loss optical fibers such that the core is in line contact along the entire length of the coated substrate tube. The glass transition temperature of the core 30 must be more than 300 degrees C. less than the glass transition temperature of the substrate tube. The core glass rod 30 and cladding glass 26 coated substrate tube 10 are then progressively heated in furnaces 16 and 18 to a temperature of around 2000 degrees C. so that the core glass wets the coated tube forming a thin film around the circumference of the tube and a melt pool or reservoir 15 at the bottom of the tube. At the high drawing temperature the potassium and sodium ions in the core and the cladding glass are exchanged. The high drawing temperature and the dwell time in the melt reservoir provide an area for ion diffusion and allow for accurate control of the refraction index profile.

In producing single mode, graded optical fibers using compound glass cores and low loss small core diameter fibers by this method, a thin glass rod, on the order of a few hundred microns, is inserted along the inside of the coated substrate tube. The composite structure is then heated to the desired drawing temperature. The core melts and spreads as a thin film on the inside of the substrate tube. Since the core diameter is very small no melt reservoir 15 can be seen. The required fiber core diameter is determined from the desired resultant fiber numerical aperture and the operational wavelength range. At a given operating wavelength range, the numerical aperture of a fiber, with a fixed core diameter, determines the light gathering ability of the fiber. The more closely the numerical aperture of the fiber approaches unity the greater its light gathering ability The numerical aperture of a fiber is measured by the formula, $$NA = (N_1^2 - N_2^2)^{\frac{1}{2}},$$

where NA is the numerical aperture of the fiber, and $N_1$ and $N_2$ are the refractive indicies of the core and cladding materials, respectively. The numerical aperture of the fiber is equal to the sine of one-half the angle of acceptance of the light guided by the fiber. The low loss, compound glass core, single mode optical fibers made in accordance with this method are desirable for achieving high numerical apertures for high bandwidths. Furthermore, it is possible to adapt the single mode fiber to achieve an even higher bandwidth for telecommunications and for sensitive measurements by creating a single polarization guidance in the fiber. The single polarization eliminates the other polarization which may contribute to undesirable background noise. Single polarization in a single mode compound glass core may be obtained by selecting the core glass and cladding glass compositions from a wide range of compositions having a broad range of thermal expansion differentials between them.

What is claimed is:

1. A process for making an optical fiber having a glass core enveloped by a glass cladding of lower index of refraction comprising, inserting a rod of the desired core glass composition into a tube made of the desired cladding composition with the rod in line contact with the inner surface of said tube, the glass transition temperature of said core glass composition being substantially lower than the glass transition temperature of said cladding composition, applying heat to said tube and rod at a temperature such that at least the lowermost portion of said rod melts and forms a film which wets the inner surface of the tube while the tube is still solid, permitting the film of melted core glass to form a melt pool at the bottom of said tube, and drawing said melt pool and tube into said optical fiber.

2. A process according to claim 1, wherein the glass transition temperature of said tube is at least 200 degrees C. greater than the glass transition temperature of said rod.

3. A process according to claims 1 or 2, wherein the core glass is fined in the form of said film prior to reaching the melt pool.

4. A process for making an optical fiber having a glass core enveloped by a glass cladding of lower index of refraction comprising, lowering a rod of the desired core glass composition into a tube made of the desired cladding composition while maintaining the rod in line contact with the inner surface of said tube, the glass transition temperature of said core glass composition being substantially lower than the glass transition temperature of said cladding composition, controlling the rate at which the rod is lowered into the tube while applying heat to said tube and rod at a temperature such that at least the lowermost portion of said rod melts and forms a film which wets the inner surface of the tube while the tube is still solid, said rate being low enough to enable said film to be fined to a bubble-free state prior to forming a melt pool at the bottom of said tube, and drawing said melt pool and tube into said optical fiber.

5. A process according to claim 4, wherein the glass transition temperature of said tube is at least 200 degrees C. greater than the glass transition temperature of said rod.

6. A process for making a graded optical fiber having a glass core enveloped by a cladding glass coated substrate tube comprising, depositing a cladding glass composition, having a refractive index lower than the refractive index of the core, on the inside of the substrate tube by modified chemical vapor deposition means to form a coated substrate tube, inserting a rod of the desired core glass composition into the coated substrate tube with the rod in line contact with said coated substrate tube, the glass transition temperature of said core glass composition being substantially lower than the glass transition temperature of the substrate tube, applying heat to said coated substrate tube and rod at a temperature such that at least the lowermost portion of said rod melts and forms a film which wets the inner surface of the tube while the tube is still solid, permitting ion exchange to occur between the core glass and the cladding glass, and drawing the rod and coated substrate tube together to form a graded optical fiber.

7. The process of claim 6 wherein potassium ions in the cladding glass exchange with sodium ions in the core.

8. The process of claim 6 wherein the diameter of the desired core glass rod is very thin and the thermal expansion differential between the core glass and the cladding glass compositions is such that by selecting the diameter of the core a single mode, single polarization, compound glass core, optical fiber is formed.

* * * * *